United States Patent
Ribeiro Dias et al.

(10) Patent No.: US 12,390,958 B2
(45) Date of Patent: *Aug. 19, 2025

(54) SIEVING OF MATERIALS IN SOLAR MODULE FOR RECYCLING

(71) Applicant: SOLARCYCLE, Inc., Mesa, AZ (US)

(72) Inventors: Pablo Ribeiro Dias, Mesa, AZ (US); Lucas Margarezzi Schmidt, Mesa, AZ (US)

(73) Assignee: SOLARCYCLE, Inc., Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,343

(22) Filed: Jul. 8, 2024

(65) Prior Publication Data

US 2025/0010522 A1    Jan. 9, 2025

Related U.S. Application Data

(60) Provisional application No. 63/512,472, filed on Jul. 7, 2023.

(51) Int. Cl.
    *B29B 17/02* (2006.01)

(52) U.S. Cl.
    CPC ...... *B29B 17/02* (2013.01); *B29B 2017/0224* (2013.01); *B29B 2017/0268* (2013.01)

(58) Field of Classification Search
    CPC ............ B29B 17/02; B29B 2017/0224; B29B 2017/0268
    See application file for complete search history.

(56) References Cited

U.S. PATENT DOCUMENTS

| 4,309,204 A | 1/1982 | Brooks |
| 6,129,779 A | 10/2000 | Bohland et al. |

(Continued)

FOREIGN PATENT DOCUMENTS

| AU | 2021904167 | 12/2021 |
| BR | 1020160250978 | 6/2020 |

(Continued)

OTHER PUBLICATIONS

Kice, "Multi-Aspirator for particle density separation", Mar. 23, 2023, https://web.archive.org/web/20230323152917/https://www.kice.com/product-specs/multi-aspirator-for-particle-density-separation/ (Year: 2023).*

(Continued)

*Primary Examiner* — Jacob S. Scott
*Assistant Examiner* — Miraj T. Patel

(57) ABSTRACT

Embodiments of apparatuses and methods of solar module recycling, employ sieving for separation of materials. According to one embodiment, a method comprises milling a solar module to create a first feedstock comprising polymer, copper, and silicon. A first sieving of the first feedstock is performed to create a first retained fraction and a first passed fraction. The first retained fraction is re-milled. A second sieving of the first passed fraction is performed to create a second retained fraction and a second passed fraction. Electrostatic separation of the second retained fraction is performed to create a conductive fraction enriched in copper. A third sieving of the second passed fraction may create a third retained fraction and a third passed fraction. Electrostatic separation of the third retained fraction can create a conductive fraction enriched in silicon.

19 Claims, 14 Drawing Sheets

(56) References Cited

U.S. PATENT DOCUMENTS

| | | | |
|---|---|---|---|
| 6,781,344 | B1 | 8/2004 | Hedegor et al. |
| 6,902,604 | B2 | 6/2005 | Heckel et al. |
| 7,105,041 | B2 | 9/2006 | Dunn |
| 7,731,920 | B2 | 6/2010 | Rhenakis et al. |
| 8,448,318 | B2 | 5/2013 | Murphy |
| 10,092,907 | B2 | 10/2018 | Mankosa et al. |
| 10,385,421 | B2 | 8/2019 | Tao et al. |
| 11,491,774 | B1 | 11/2022 | Lee |
| 12,005,485 | B2 | 6/2024 | Ribeiro Dias et al. |
| 2002/0189977 | A1 | 12/2002 | Maehata et al. |
| 2007/0189435 | A1 | 8/2007 | Tani et al. |
| 2012/0325676 | A1 | 12/2012 | Taylor et al. |
| 2014/0000316 | A1 | 1/2014 | Coggin |
| 2020/0148585 | A1 | 5/2020 | Nakano et al. |
| 2020/0198316 | A1 | 6/2020 | Coustier et al. |
| 2020/0238679 | A1* | 7/2020 | Kernbaum ............ H10F 19/00 |
| 2020/0247106 | A1 | 8/2020 | Lee |
| 2020/0282432 | A1 | 9/2020 | Khadilkar |
| 2021/0263181 | A1 | 8/2021 | Jukkola et al. |
| 2022/0140175 | A1 | 5/2022 | Matsumoto et al. |
| 2023/0019898 | A1 | 1/2023 | Lee |
| 2023/0116994 | A1 | 4/2023 | Tahata et al. |
| 2023/0339003 | A1 | 10/2023 | Ribeiro Dias et al. |
| 2023/0343654 | A1 | 10/2023 | Ribeiro Dias et al. |
| 2023/0405652 | A1 | 12/2023 | Ribeiro Dias et al. |
| 2024/0181511 | A1 | 6/2024 | Ribeiro Dias et al. |
| 2024/0246090 | A1 | 7/2024 | Ribeiro Dias et al. |
| 2024/0351050 | A1 | 10/2024 | Ribeiro Dias |
| 2024/0383022 | A1 | 11/2024 | Ribeiro Dias et al. |
| 2024/0391139 | A1* | 11/2024 | Groppo ................. B29B 17/02 |

FOREIGN PATENT DOCUMENTS

| | | | | |
|---|---|---|---|---|
| BR | 1020200124161 | | 6/2020 | |
| CN | 202555405 | | 11/2012 | |
| CN | 102953081 | A | 3/2013 | |
| CN | 103978021 | B | 8/2014 | |
| CN | 106629738 | | 5/2017 | |
| CN | 106834700 | A | 6/2017 | |
| CN | 110404920 | A | 11/2019 | |
| CN | 209929333 | | 1/2020 | |
| CN | 113215412 | A | 8/2021 | |
| CN | 115358968 | A | 11/2022 | |
| DE | 4300870 | A1 * | 7/1994 | ............ B03B 5/60 |
| EP | 279200 | | 8/1988 | |
| EP | 2997169 | | 3/2016 | |
| EP | 4169619 | A1 | 4/2023 | |
| FR | 3096833 | A1 | 3/2022 | |
| FR | 3140289 | A1 | 4/2024 | |
| GB | 2300827 | A | 11/1996 | |
| JP | 2011173099 | | 9/2011 | |
| JP | 2016036756 | A | 3/2016 | |
| JP | 2017-006839 | A | 1/2017 | |
| JP | 2018086651 | | 6/2018 | |
| KR | 10-2013-0060708 | | 6/2013 | |
| KR | 20130104794 | A | 9/2013 | |
| KR | 101842224 | | 3/2018 | |
| KR | 10-2020-0095749 | | 8/2020 | |
| KR | 102283519 | B1 | 7/2021 | |
| KR | 1020210082629 | | 7/2021 | |
| KR | 1020210083721 | A | 7/2021 | |
| KR | 10-2303527 | | 9/2021 | |
| KR | 10-2337586 | | 12/2021 | |
| KR | 20220026695 | A | 3/2022 | |
| WO | 2005024854 | | 3/2005 | |
| WO | 2006130715 | A3 | 12/2006 | |
| WO | 2012083398 | | 6/2012 | |
| WO | 2013057035 | | 4/2013 | |
| WO | 2017100443 | | 6/2017 | |
| WO | 2018039146 | | 3/2018 | |
| WO | 2018218358 | A1 | 12/2018 | |
| WO | 2019122567 | A1 | 6/2019 | |
| WO | 2021149545 | | 7/2021 | |
| WO | PCT/AU2022/051545 | | 12/2022 | |
| WO | 2023150831 | | 8/2023 | |

OTHER PUBLICATIONS

M. Wagar Akram et al. "CNN based automatic detection of photovoltaic cell defects in electroluminescence images", ScienceDirect, December 2019, vol. 189. pp. 1-8.

S. Prabhakaran et al. "Deep Learning-Based Model for Defect Detection and Localization on Photovoltaic Panels", Computer Systems Science & Engineering, 2022, pp. 1-18.

Xiaolong Zhao et al. "HRNet-based automatic identification of photovoltaic module defects using electroluminescence images", ScienceDirect, March 2023, vol. 267, pp. 1-7.

Sharmarke Hassan et al. "Dual spin max pooling convolutional neural network for solar cell crack detection", Scientific reports, 2023, pp. 1-16, www.nature.com/scientificreports, https://doi.org/10.1038/s41598-023-38177-8.

Fatma Mazen et al. "Deep Learning for Automatic Defect Detection in PV Modules using Electroluminescence Images", IEEE Access, 2023, vol. 11, pp. 57783-57795.

Jinxia Zhang et al. "A lightweight network for photovoltaic cell defect detection in electroluminescence images of heterojunction solar cells", arXiv:2302.07455v, Feb. 2023, pp. 1-12.

Alexey Korovin et al. "Anomaly detection in electroluminescence images of heterojunction solar cells" ScienceDirect, 2023, vol. 259, p. 130-136.

Aidong Chen et al. "Anomaly Detection Algorithm for Photovoltaic Cells Based on Lightweight Multi-Channel Spatial Attention Mechanism", Energies, 2023, pp. 1-15, vol. 16, Issue 4.

Samuel G. Muller et al. "TrivialAugment: Tuning-free Yet State-of-the-Art Data Augmentation", In Proceedings of the IEEE/CVF international conference on computer vision, 2021, pp. 774-782.

Alexey Dosovitsky et al. "An image is worth 16x16 words Transformers for image recognition at scale", Published as a conference paper at ICLR, 2021, pp. 1-22.

Ilya Loshchilov et al. "Decoupled Weight Decay Regularization", Published as a conference paper at ICLR, 2019, pp. 1-8, Freiburg, Germany.

Haiyong Chen et al. "Solar cell surface defect inspection based on multispectral convolutional neural network", Journal of Intelligent Manufacturing, 2020, vol. 31, p. 1-14.

Chalaux, Recycled Silicon for Chlorosilane Production, ROSI, Evonik, Sep. 11, 2024, 15 pgs., www.rosi-solar.com, www.evonik.com.

Ribeiro et al., Delamination of Used Solar Module, Utility Patent Application Filed with the USPTO on Jan. 10, 2024, 35 pgs., U.S. Appl. No. 18/409,600.

Solar Panel Recycling Service NPC Incorporated. https://www.npcgroup.net/eng/solarpower/reuse-recycle/recycle-service, 2022.

Joel Spaes. "New delamination technique for PV module recycling" Pv Magazine International. https://www.pvmagazine.com/2021/03/19/new-delamination-technique-for-pv-module-recycling/, 2021.

Manzil. "Hanging Solar Chargers" Trend Hunter Inc. https://www.trendhunter.com/trends/sunbox-solar-panels, 2010.

Mystery of Prince Rupert's Drop at 130,000 fps—Smarter Every Day 86 YouTube. https://www.youtube.com/watch?v=xe-f4gokRBs, 2013.

The Action Lab. "This Light Lets You See the Strength of an Object" YouTube. https://www.youtube.com/watch?v=jFwm3TIC750, 2021.

Marianna Ottoni et al. "A circular approach to the e-waste valorization through urban mining in Rio de Janeiro, Brazil" Journal of Cleaner Production, 2020, vol. 261. https://doi.org/10.1016/j.jclepro.2020.120990.

Rong Deng et al. "A sustainable chemical process to recycle end-of-life silicon solar cells" Green Chemistry, 2021, vol. 23, Issue 24, pp. 10157-10167. https://doi.org/10.1039/d1gc02263f.

Pablo Dias et al. "Carbon emissions and embodied energy as tools for evaluating environmental aspects of tap water and bottled water in Brazil". Desalination and Water Treatment, 2015, vol. 57, Issue 28, pp. 13020-13029. https://doi.org/10.1080/19443994.2015.1055815.

(56) References Cited

OTHER PUBLICATIONS

Pablo Dias et al. "Recycling Crystalline Silicon Photovoltaic Modules". Emerging Photovoltaic Materials, 2019, vol. 57, pp. 61-102. https://doi.org/10.1002/9781119407690.ch3.

Pablo Dias et al. "Comprehensive recycling of silicon photovoltaic modules incorporating organic solvent delamination—technical, environmental and economic analyses". Resources, Conservation and Recycling, 2021, vol. 165. https://doi.org/10.1016/j.resconrec.2020.105241.

Marcelo Pilotto Cenci et al. "Eco-Friendly Electronics—A Comprehensive Review". Advanced Materials Technologies. https://doi.org/10.1002/admt.202001263, 2021.

Michael Eisenstein. "Upgrading the electronics ecosystem". The circular economy. Springer Nature Limited., 2022, pp. 8-10, vol. 611.

Pablo Dias et al. "Electronic waste in Brazil: Generation, collection, recycling and the covid pandemic". Cleaner Waste Systems, 3, 100022. https://doi.org/10.1016/j.clwas.2022.100022, 2022.

Pablo Dias et al. "Ensuring best E-waste recycling practices in developed countries: An Australian example". Journal of Cleaner Production, 2019, pp. 846-854. https://doi.org/10.1016/j.jclepro.2018.10.306.

Pablo Dias et al. "High yield, low cost, environmentally friendly process to recycle silicon solar panels: Technical, economic and environmental feasibility assessment". Renewable and Sustainable Energy Reviews. https://doi.org/10.1016/j.rser.2022.112900, 2022.

Verity Tan et al. "Estimating the Lifetime of Solar Photovoltaic Modules in Australia". Sustainability. https://doi.org/10.3390/su14095336, 2022.

Pablo Dias et al. "Lead hazard evaluation for cathode ray tube monitors in Brazil". Brazilian Journal of Chemical Engineering, 2018, vol. 35, pp. 43-49. https://doi.org/10.1590/0104-6632.20180351s20160367.

Pablo Dias et al. "Photovoltaic solar panels of crystalline silicon: Characterization and separation". Waste Management & Research: The Journal for a Sustainable Circular Economy, 2016, vol. 34(3), pp. 235-245. https://doi.org/10.1177/0734242x15622812.

Priscila Silva Silveira Camaargo et al. "Photovoltaic Module Recycling: Thermal Treatment to Degrade Polymers and Concentrate Valuable Metals". Detritus, 2021, vol. 16, pp. 48-62. https://doi.org/10.31025/2611-4135/2021.15119.

Pablo Dias et al. "Recycling Waste Crystalline Silicon Photovoltaic Modules by Electrostatic Separation". Journal of Sustainable Metallurgy, 2018, pp. 176-186, https://doi.org/10.1007/s40831-018-0173-5.

Pablo Dias et al. "Recycling WEEE: Extraction and concentration of silver from waste crystalline silicon photovoltaic modules". Waste Management, 2016, vol. 57, pp. 220-225. https://doi.org/10.1016/j.wasman.2016.03.016.

Pablo Dias et al. "Recycling WEEE: Polymer characterization and pyrolysis study for waste of crystalline silicon photovoltaic modules". Waste Management, 2017, vol. 60, pp. 716-722. https://doi.org/10.1016/j.wasman.2016.08.036.

Rong Deng et al. "Remanufacturing end-of-life silicon photovoltaics: Feasibility and viability analysis". Progress in Photovoltaics: Research and Applications, 2020, pp. 760-774, https://doi.org/10.1002/pip.3376.

Alison Lennon et al. "The aluminium demand risk of terawatt photovoltaics for net zero emissions by 2050". Nature Sustainability, 2022, pp. 357-363, https://doi.org/10.1038/s41893-021-00838-9.

Brett Hallam et al. "The silver learning curve for photovoltaics and projected silver demand for net-zero emissions by 2050". Progress in Photovoltaics: Research and Applications, 2022, https://doi.org/10.1002/pip.3661.

Pablo Dias et al. "Waste electric and electronic equipment (WEEE) management: A study on the Brazilian recycling routes". Journal of Cleaner Production, 2018, pp. 7-16. https://doi.org/10.1016/j.jclepro.2017.10.219.

Pablo Dias et al. "Waste electrical and electronic equipment (WEEE) management: An analysis on the australian e- waste recycling scheme". Journal of Cleaner Production, 2018, pp. 750-764. https://doi.org/10.1016/j.jclepro.2018.06.161.

Md Tasbirul Islam et al. "Waste mobile phones: A survey and analysis of the awareness, consumption and disposal behavior of consumers in Australia". Journal of Environmental Management, 2020, https://doi.org/10.1016/j.jenvman.2020.111111.

Pablo Dias et al. "What drives WEEE recycling? A comparative study concerning legislation, collection and recycling". Waste Management & Research: The Journal for a Sustainable Circular Economy, 2022, https://doi.org/10.1177/0734242x221081660.

Md Tasbirul Islam et al. "Young consumers' e-waste awareness, consumption, disposal, and recycling behavior: A case study of university students in Sydney, Australia". Journal of Cleaner Production, 2021, https://doi.org/10.1016/j.jclepro.2020.124490.

A. Krummenauer et al. "Determining the LOD and LOQ in steel alloys analysis using NITON spectrometer", Journal of Physics: Conference Series, 2021, https://doi.org/10.1088/1742-6596/1826/1/012008.

A. Krummenauer et al. "Estimation of measurement uncertainty in the EDXRF spectrometry of stainless steel", Journal of Physics: Conference Series, 2021, https://doi.org/10.1088/1742-6596/1826/1/012011.

Md Tasbirul Islam et al. "Comparison of E-Waste Management in Switzerland and in Australia: A Qualitative Content Analysis." World Academy of Science, Engineering and Technology International Journal of Environmental and Ecological Engineering, 2018, pp. 610-616.

P.R. Dias. "Recycling waste solar modules using organic solvents." http://uest.ntua.gr/heraklion2019/proceedings/pdf/74_HERAKLION%202019_Dias_etal.pdf. 2020, pp. 21-24.

T. M. Bruton et al. "Re-Cycling of High Value, High Energy Content Components of Silicon PV Modules", 12th European Photovoltaic Solar Energy Conference, 1994, pp. 302-305, Amsterdam, The Netherlands.

Valeria Fiandra et al. "Silicon photovoltaic modules at end-of-life: Removal of polymeric layers and separation of materials", Waste Management, 2019, pp. 97-107, vol. 87, Italy.

Cynthia Latunussa et al. "Life Cycle Assessment of an innovative recycling process for crystalline silicon photovoltaic panels", Solar Energy Materials & Solar Cells, 2016, pp. 101-111, vol. 156, Italy.

Dion Thompson "Thermal Treatment of End of Life PV Modules", School of Photovoltaic and Renewable Energy Engineering Faculty of Engineering, The University of New South Wales, Nov. 25, 2019.

Priscila Silva Silveira Camargo, ""Recycling of Crystalline Silicon Photovoltaic Modules: Separation and Concentration of Materials"", Universidade Federal Do Rio Grande Do Sul School of Engineering Dissertation, May 2021, pp. 1-168, Porto Alegre, Brazil.

Priscila Silva Silveira Camargo et al., "c-Si PV Module Recycling: Analysis of the use of a Mechanical Pretreatment to Reduce the Environmental Impact of Thermal Treatment and Enhance Materials Recovery," Waste Management & Research: The Journal for a Sustainable Circular Economy, pp. 1-126, http://mc.manuscriptcentral.com/wmr.

Zisheng Zhang et al. "Electrostatic separation for recycling silver, silicon and polyethylene terephthalate from waste photovoltaic cells", Modern Physics Letters B, World Scientific 2017, Abstract page, vol. 31, Issue 11, https://doi.org/10.1142/S0217984917500877.

Keith Burrows et al., "Glass needs for a Growing Photovoltaics Industry", Solar Energy Materials and Solar Cells, Jan. 2015, p. 1-13, vol. 132.

Archivist, "Saint-Gobain Produces the First Zero-Carbon Flat Glass", Energy & Environment Jun. 2022, USGlass Magazine & USGNN Headline News, Jun. 27, 2022.

Eckersley O'callaghan, "Climate Friday | Glass—The recyclable material we're not recycling", EOC Engineers, Jul. 14, 2021.

"Machine learning-powered module end-of-life decisions from luminescence images", Asia-Pacific Solar Research Conference, Nov.-Dec. 2022, 4 pgs., Newcastle, Australia.

(56) References Cited

OTHER PUBLICATIONS

Brendan Wright et al. "Machine learning-powered module end-of-life decision making based on luminescence images", The University of New South Wales, Sydney, Australia.

Matthias Demant et al. "Micro-Cracks in Silicon Wafers and Solar Cells Detection and Rating of Mechanical Strength and Electrical Quality", In Proceedings of the 29th Solar Energy Conference and Exhibition, 2014, p. 390-396.

Matthias Demant et al. "Microcracks in Silicon Wafers I: Inline Detection and Implications of Crack Morphology on Wafer Strength", IEEE Journal of Photovoltaics, Jan. 2016, pp. 126-135, vol. 6, No. 1.

Matthias Demant et al. "Deep Learning Approach to Inline Quality Rating and Mapping of Multi Crystalline Si-Wafers", In Proceedings of the 35th European Photovoltaic Solar Energy Conference and Exhibition, Sep. 2018, p. 814-818, Brussels, Belgium.

Sachin Mehta et al. "Deepsolareye Power Loss Prediction and Weakly Supervised Soiling Localization via Fully Convolutional Networks for Solar Panels", arXiv:1710.03811v1, Oct. 2017, pp. 333-342.

\* cited by examiner

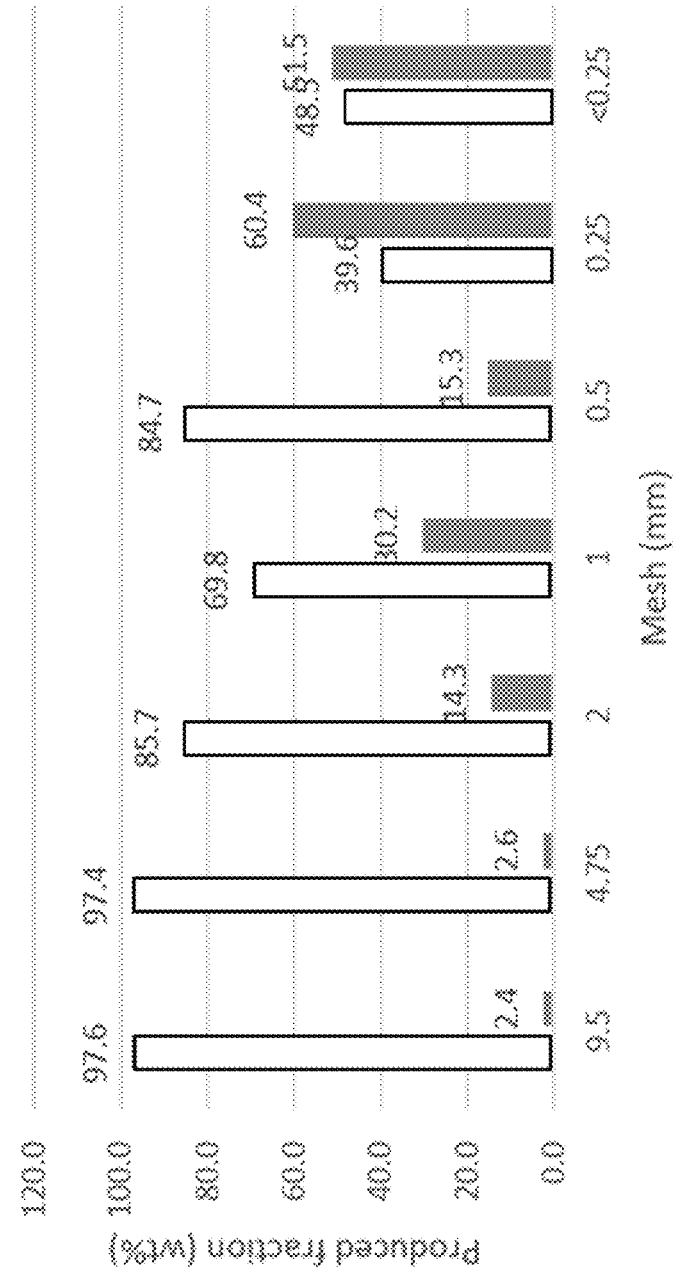

SIEVING OF MATERIALS IN SOLAR MODULE FOR RECYCLING

CROSS-REFERENCE TO RELATED APPLICATION

The instant nonprovisional patent application claims priority to U.S. Provisional Patent Application No. 63/512,472, filed Jul. 7, 2023 and incorporated by reference herein for all purposes.

BACKGROUND

As world population increases, the earth is subjected to escalating environmental stress. One form of stress is manifest in rising global temperatures attributable to the burning of fossil fuels in order to provide energy needs.

Alternative energy sources can provide power, while lessening the carbon dioxide burden on the planet. One important source of alternative energy is solar power.

Solar modules are complex manufactured items. They harness the sun's energy and convert it into a usable energy source for residential, commercial and utility-scale applications. As the climate has been significantly impacted by the use of fossil fuels over the past century, the need for alternative sources of energy like solar has taken on greater importance.

Another form of environmental stress imposed upon the earth, is the accumulation and disposal of waste products from human activity. Accordingly, rather than discarding a solar module at the end of its lifetime, it may be desirable to recycle material(s) from a solar module for reuse and thereby avoid deposition in a landfill.

SUMMARY

Embodiments of apparatuses and methods of solar module recycling, employ sieving for the separation of materials. According to one embodiment, a method comprises milling a solar module to create a first feedstock comprising polymer, copper, and silicon. A first sieving of the first feedstock is performed to create a first retained fraction and a first passed fraction. The first retained fraction is re-milled. A second sieving of the first passed fraction is performed to create a second retained fraction and a second passed fraction. Electrostatic separation of the second retained fraction is performed to create a conductive fraction enriched in copper. A third sieving of the second passed fraction may create a third retained fraction and a third passed fraction. Electrostatic separation of the third retained fraction can create a conductive fraction enriched in silicon.

BRIEF DESCRIPTION OF THE DRAWINGS

FIG. 6 is a table showing the configuration of the electrostatic separator.

FIG. 7 shows weight of fractions related to initial mass for each sieve.

DESCRIPTION

Solar modules exist in a variety of types and architectures. Examples of such modules can include but are not limited to:
  Monocrystalline Solar Panels (Mono-SI)
  Polycrystalline Solar Panels (p-Si)
  Amorphous Silicon Solar Panels (A-SI)
  Cadmium telluride photovoltaics (CdTe)
  Copper indium gallium selenide modules (CIGS)
  Copper indium selenide modules (CIS)
  Concentrated PV Cell (CVP)
  Biohybrid Solar modules
  Monofacial modules
  Bifacial modules
  Modules without encapsulant
  Silicon heterojunction solar modules
  tunnel oxide passivated contact solar modules (TOPCON)
  passivated emitter and rear contact solar modules (PERC)
  Tandem-junction Solar Panels
  Perovskite-based Solar Panels
  Glass-Backsheet Solar Panels
  Glass-Glass Solar Panels
  Building-Integrated Solar Panels
  Polymer-Based Solar Panels
  Solar Roof Tiles
  Solar Roof Shingles Solar modules can last decades, with some degradation in performance over a module's lifetime. Also, solar modules that have been deployed on residential rooftops and other commercial and utility-scale applications for a number of years, may be decommissioned for a variety of reasons.

For example, (residential, commercial, utility) users of solar panels may desire to exchange their modules for newer, higher performing modules in order to maximize the amount of energy obtained from a solar array.

As more solar modules reach the end of their useful lives and/or are relinquished by their owners, it is desirable to dispose of the panels in an environmentally-friendly and economically-feasible way. Alternatively, it may be desired to refurbish and reuse existing solar modules to prolong their lifetimes and reduce cost.

Once it is determined that a solar module is no longer useful to its owner, e.g.:
  the module has reached the end of its current deployment due to non- or underperformance,
  the module has been damaged in transit, or
  for other (e.g., economic) reasons,
in order to avoid discarding the module into a landfill, the module may either be recycled or refurbished and reused.

Accordingly, embodiments implement materials handling in recycling of a photovoltaic module. As described in detail below, such materials handling may comprise multiple successive stages that result in separated fractions that are enriched in valuable metals or purified photovoltaic material.

Figure 13:
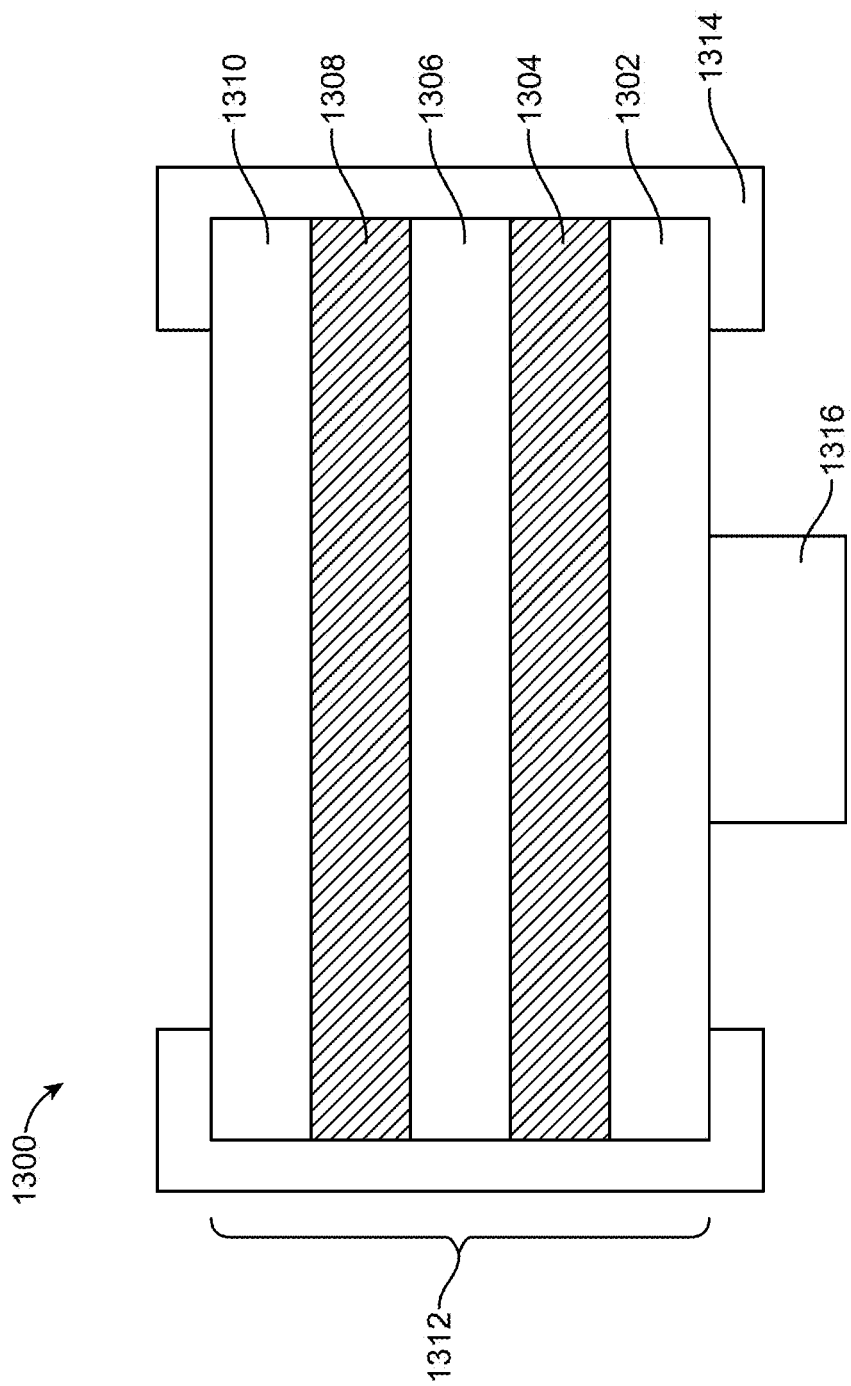
FIG. 13 shows a simplified cross-section of a solar module.

FIG. 13 shows a cross-sectional view of a monofacial solar module in an example.

The PV module 1300 is made of different layers assembled into the structure shown in FIG. 13. These layers of FIG. 13 are not drawn to scale.

The layers of FIG. 13 can be simplified as:
substrate (backsheet) 1302,
   back encapsulant 1304, e.g., Ethylene-vinyl acetate (EVA), silicone, Polyvinyl butyral (PVB), IONOMER,
   solar cell 1306 comprising PV material (including, e.g., but not limited to: doped single crystal, polycrystalline, or amorphous silicon, Group III-V materials) and metallization,
   front encapsulant 1308,
   transparent front cover sheet 1310 (e.g., typically glass). This grouping of layers is referred to as a laminate 1312.

It is further noted that bifacial modules also exist. Such bifacial modules may exhibit a structure similar to that of FIG. 13, but have a transparent (e.g., glass) layer instead of a backsheet layer. This allows (e.g., reflected) light to enter the module from the back.

The laminate in FIG. 13 is surrounded by a frame 1314. The frame may comprise a stiff metal such as aluminum. Alternatively, a frame material may be plastic, comprising e.g., polycarbonate.

A junction box 1316 is also part of the module. The junction box may be potted (more common in newer models) or non-potted (more common in older models). In a potted PV junction box, the foils coming out of the solar panel are soldered to the diodes in the junction box, and the junction box is potted or filled with a type of sticky material to allow thermal transfer of heat to keep the solder joint in place and prevent it from falling. Fabrication may take longer but creates a better seal.

In the non-potted PV junction box, a clamping mechanism is used to attach the foil to the wires in the junction box. This can involve a faster assembly, but may not be as robust.

Figure 13A:
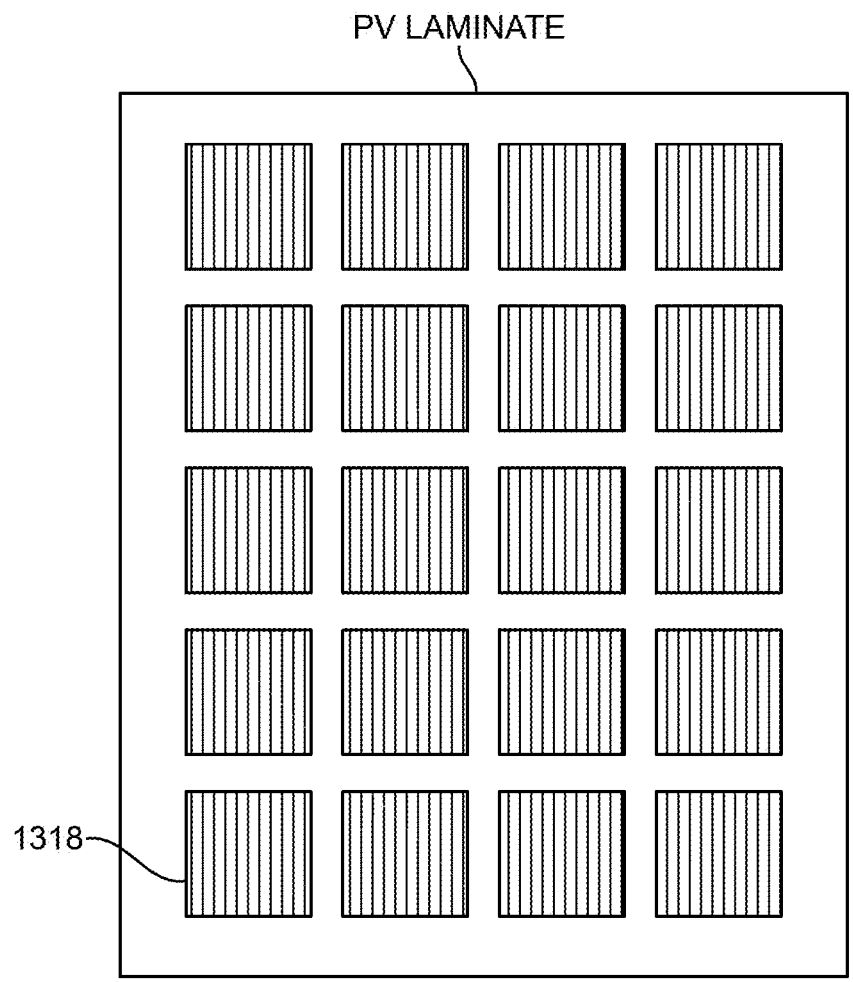
FIG. 13A shows a simplified plan view of a solar module.

FIG. 13A shows a simplified overhead view of the laminate of a solar module, lacking the frame and the top transparent sheet. FIG. 13A shows solar cells including patterned metallization 1318, which may comprise, e.g., a valuable metal such as silver.

Embodiments of apparatuses and methods of solar module recycling, employ sieving for separation of materials. According to an embodiment, a method comprises milling a solar module to create a first feedstock comprising polymer, copper, and silicon. A first sieving of the first feedstock is performed to create a first retained fraction and a first passed fraction. The first retained fraction is re-milled. A second sieving of the first passed fraction is performed to create a second retained fraction and a second passed fraction. Electrostatic separation of the second retained fraction is performed to create a conductive fraction enriched in copper. A third sieving of the second passed fraction may create a third retained fraction and a third passed fraction. Electrostatic separation of the third retained fraction can create a conductive fraction enriched in silicon.

One or more materials comprising a used solar module may be expensive (e.g., silver metal) and hence desirable to recycle. Embodiments relate to approaches for solar module recycling which employ sieving for the separation of materials.

Embodiments may permit the evaluation of visual aspects and mass distribution of different sieved fractions of a comminuted solar panel. Fractions obtained thereby may then be separated (e.g., in an electrostatic separator).

Under this methodology, a sample solar module may be milled with a screen size opening of 10 mm. Granulometry was evaluated using the following series of sieves, available from BERTEL INDUSTRIA METALURGICA of Sao Paulo Brazil.

| Sieve | ⅜ | 4 | 9 | 16 | 32 | 60 |
|---|---|---|---|---|---|---|
| Opening (mm) | 9.5 | 4.75 | 2 | 1 | 0.5 | 0.25 |

The sample was sieved for 1.5 hours in total, and weighed.

Figure 1:
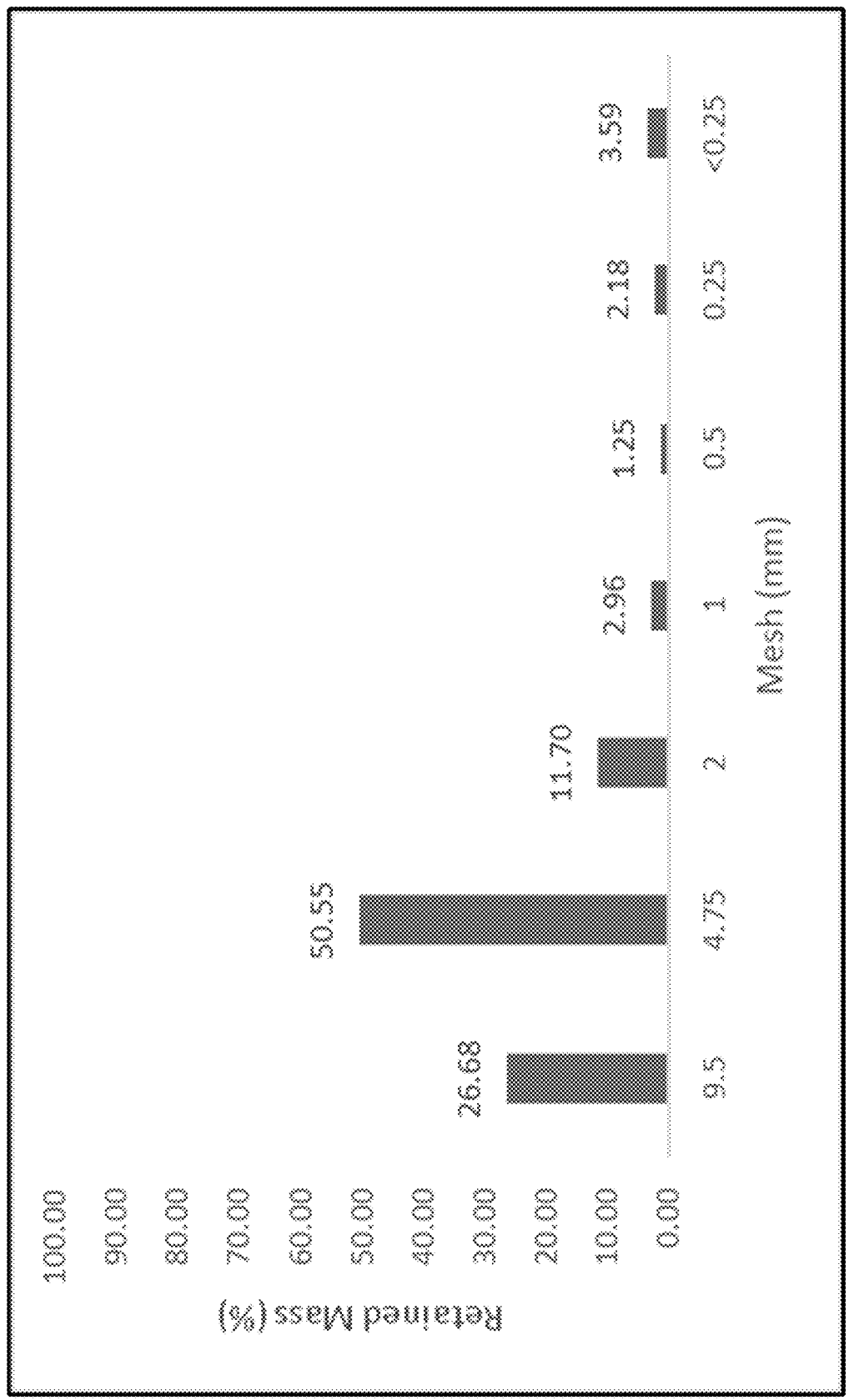
FIG. 1 plots mass distribution of a sample after sieving.
Figure 2:
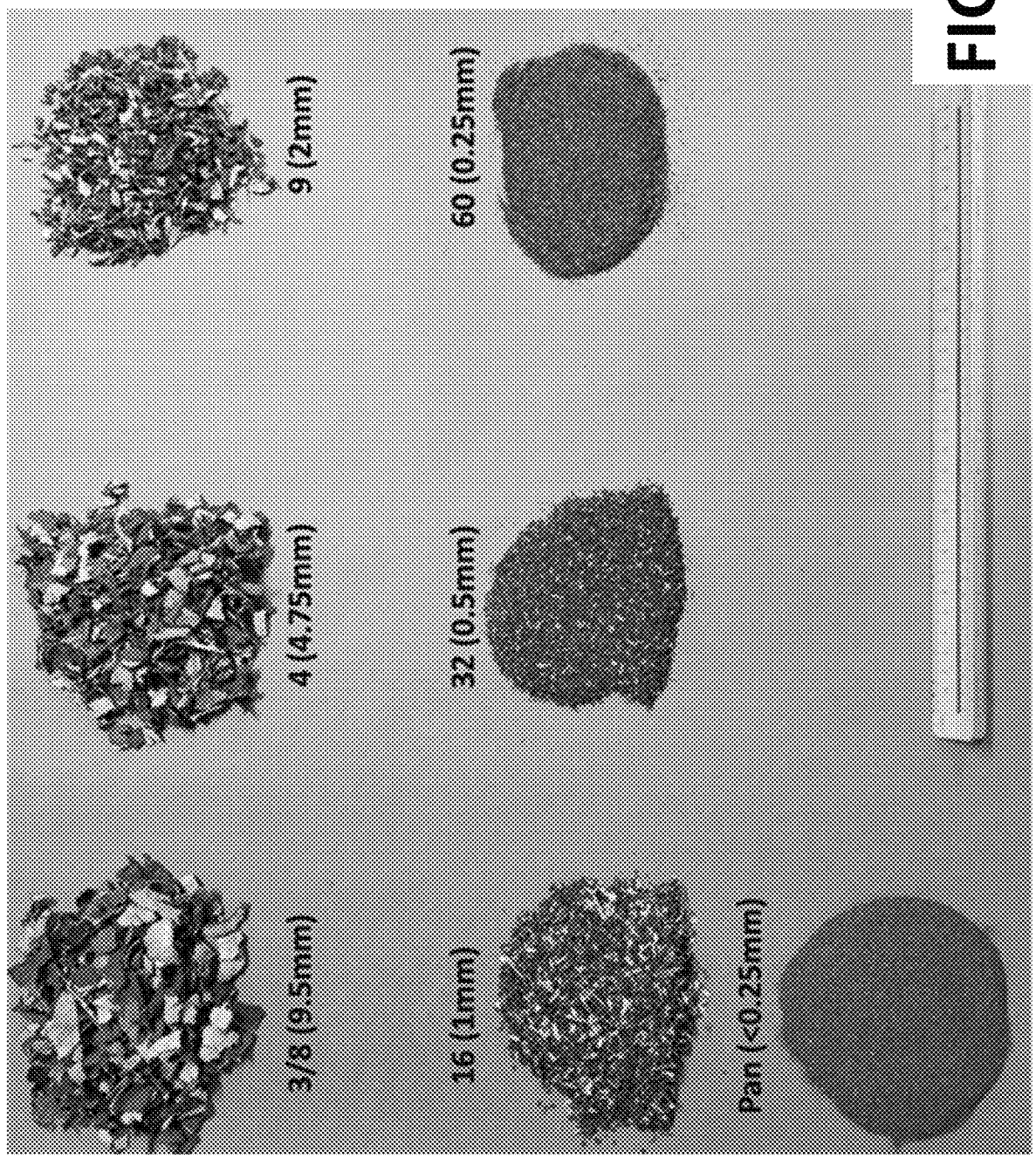
FIG. 2 shows the visual aspect of various fractions after sieving.

FIG. 1 plots the mass distribution of the sample after sieving. FIG. 2 shows the visual aspect of the various fractions after sieving.

As shown in FIG. 1, the largest fraction of the sample concentrated in the first two sieves (9.5 mm and 4.75 mm). These greater fractions are shown enlarged, in FIGS. 3A-B respectively.

Figure 3B:
FIGS. 3A-B show greater fractions enlarged.
Figure 3A:
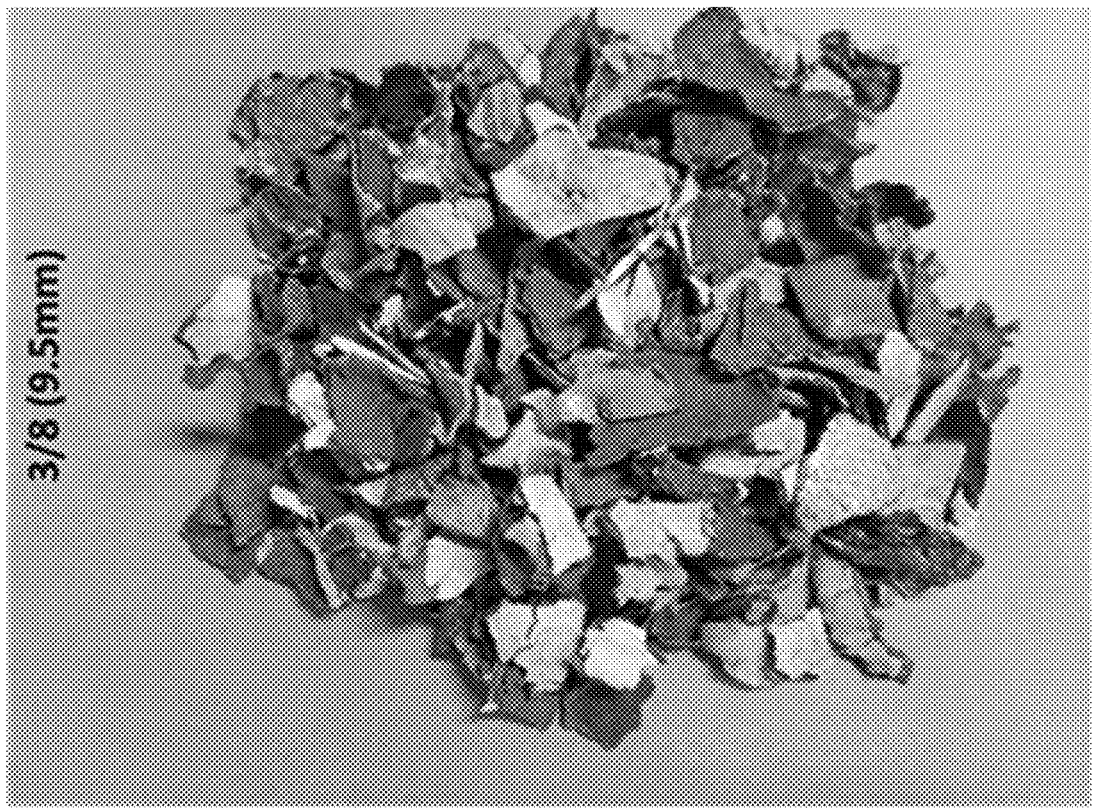

The fractions shown in FIGS. 3A-3B presented mostly encapsulated semiconductor layers, and some copper wires. In the encapsulated fraction the semiconductor layer remains, and thus represents losses of silver and silicon to the non-conductive fraction in the ES process.

Figure 4B:
FIGS. 4A-B show intermediary fractions enlarged.
Figure 4A:
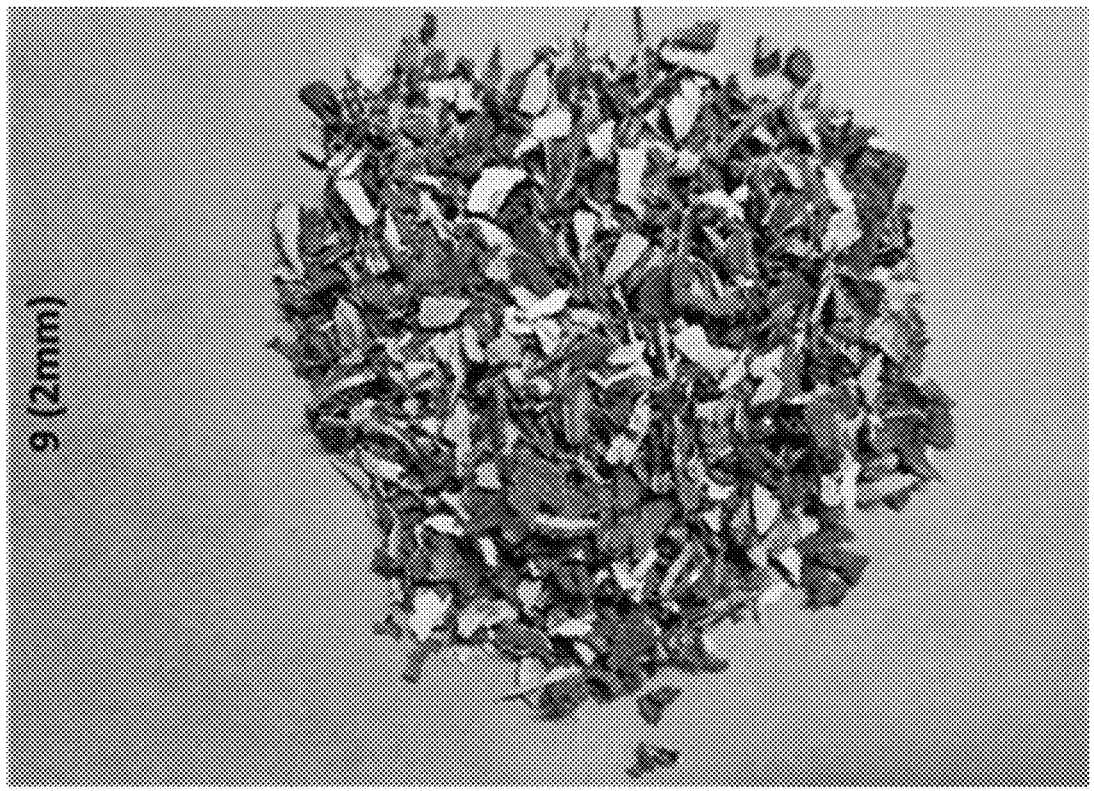

The next two (intermediary) fractions: 2 mm and 1 mm, present more apparent copper than the greater fractions. FIGS. 4A-B show enlarged views of these intermediary fractions.

Encapsulated materials may be present in the 2 mm fraction. Some fractions (e.g., the 1 mm fraction) may concentrate the copper wires of the sample. To enhance recovery of Ag and Si, such fractions may be re-milled thinner, as they present a high volume of encapsulated layers.

Figure 5C:
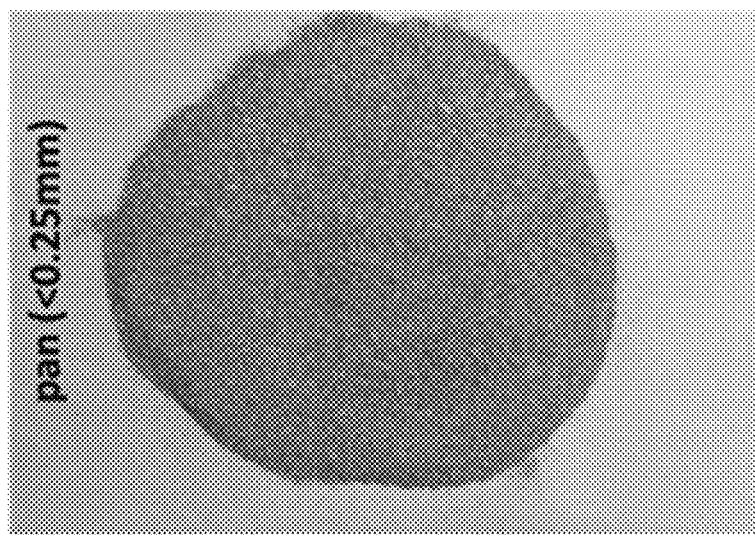
FIGS. 5A-C show fine fractions enlarged.
Figure 5B:
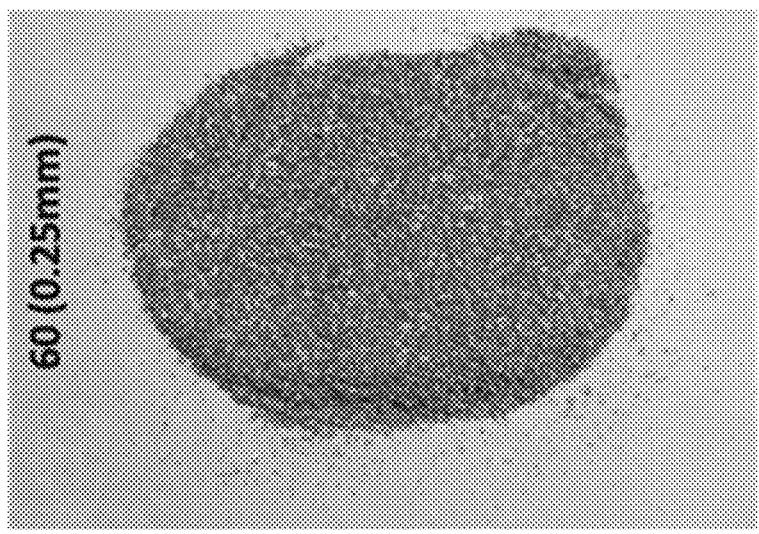
Figure 5A:
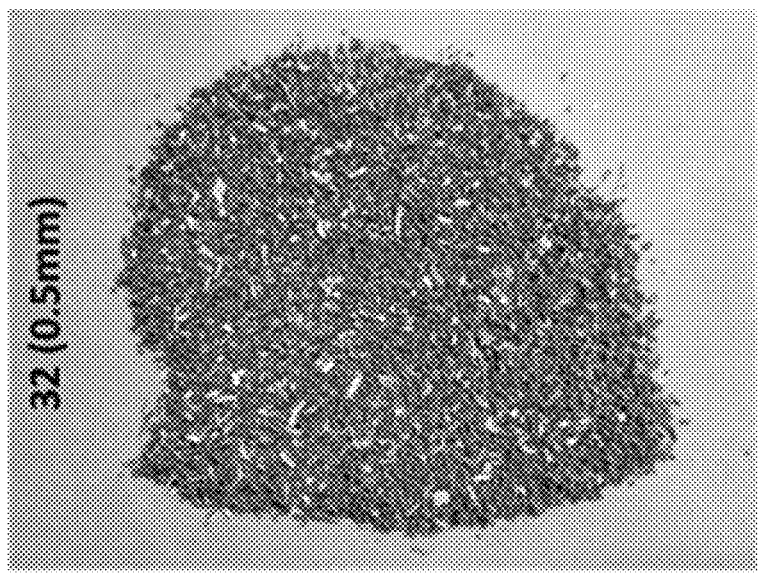

FIGS. 5A-C are enlarged views of fine fractions showing their visual aspects. The fine fractions presented the lowest fraction of copper and the highest fraction of silicon.

The various fine fractions shown in FIGS. 5A-C exhibit different coloration. This characteristic can promote analysis of the concentration of polymer in the silicon fraction.

One or more of the (greater/intermediary/fine) fractions may be subject to separation. Here, electrostatic separation of each fraction was performed, and the concentration of conductive materials in each was evaluated.

FIG. 6 is a table showing the configuration of the electrostatic separator. The electrostatic separator was model MMPM-618C obtained from INBRAS-ERIEZ of Brazil. The tension and rotation used, were 30 kV and 26 rpm respectively.

FIG. 7 shows the weight of each produced fraction related to the initial mass for each sieve. As shown in FIG. 7, the conductive fraction tends to be concentrated in the <0.25-1 mm screen size range in comparison to the non-conductive fraction.

It may be desirable to remill the coarser fractions (e.g., 4.75 and 9.5 mm). This is because only a few materials appear to be removed from these fractions, and remilling can enhance an amount of valuable materials that are ultimately recovered.

Figure 8:
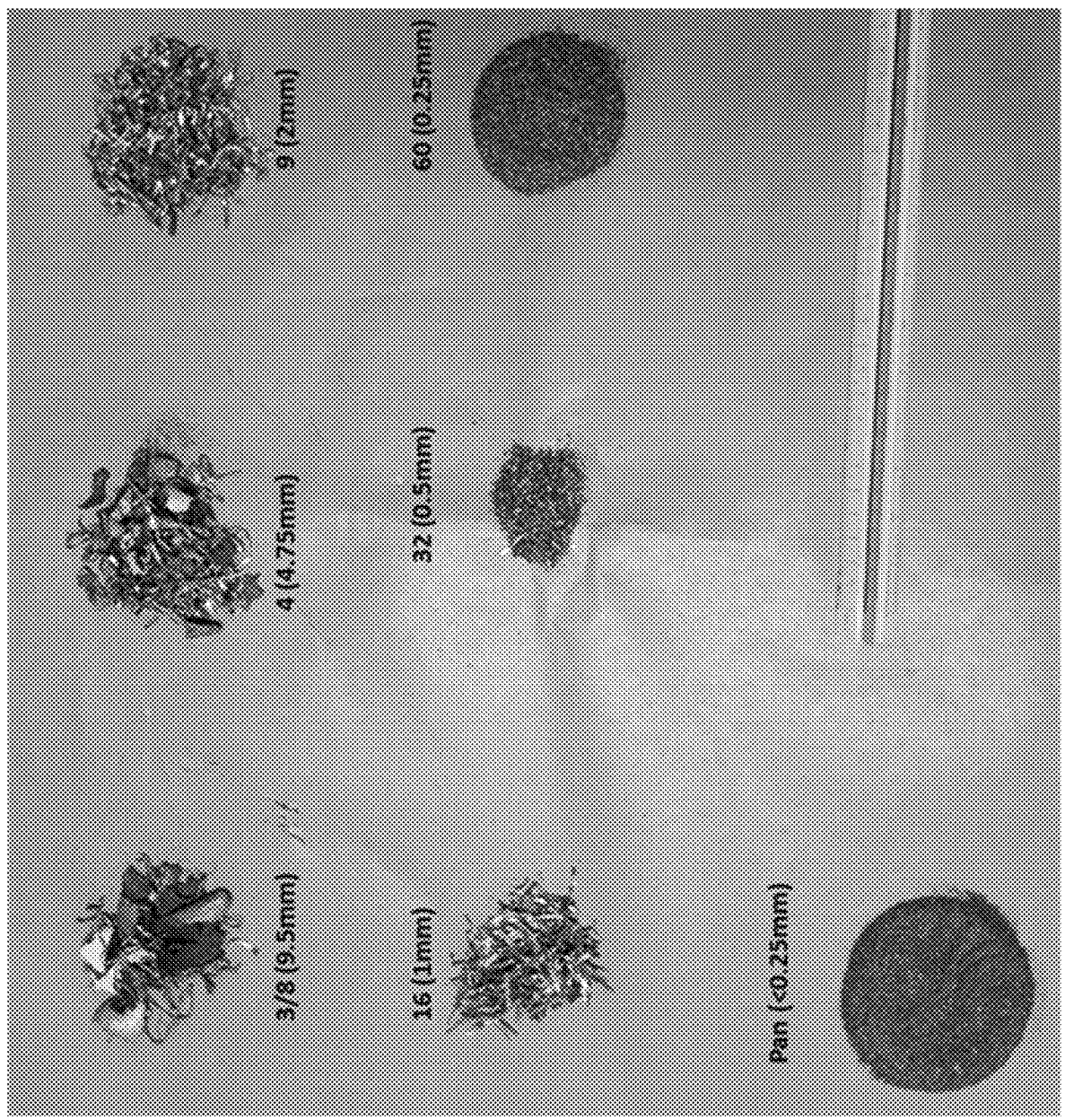
FIG. 8 shows the visual aspect of conductive material resulting from electrostatic separation of each sieved fraction.

FIG. 8 shows the visual aspect of conductive material resulting from electrostatic separation of each sieved fraction. The greater two (4.75 and 9.5 mm) fractions presented a relevant quantity of polymers. The intermediary two fractions (1 and 2 mm) presented enriched copper. The fine (≤0.25 mm) fractions were enriched in silicon/silver. A mixed fraction (0.5 mm) included both silicon and copper wires.

Figure 9:
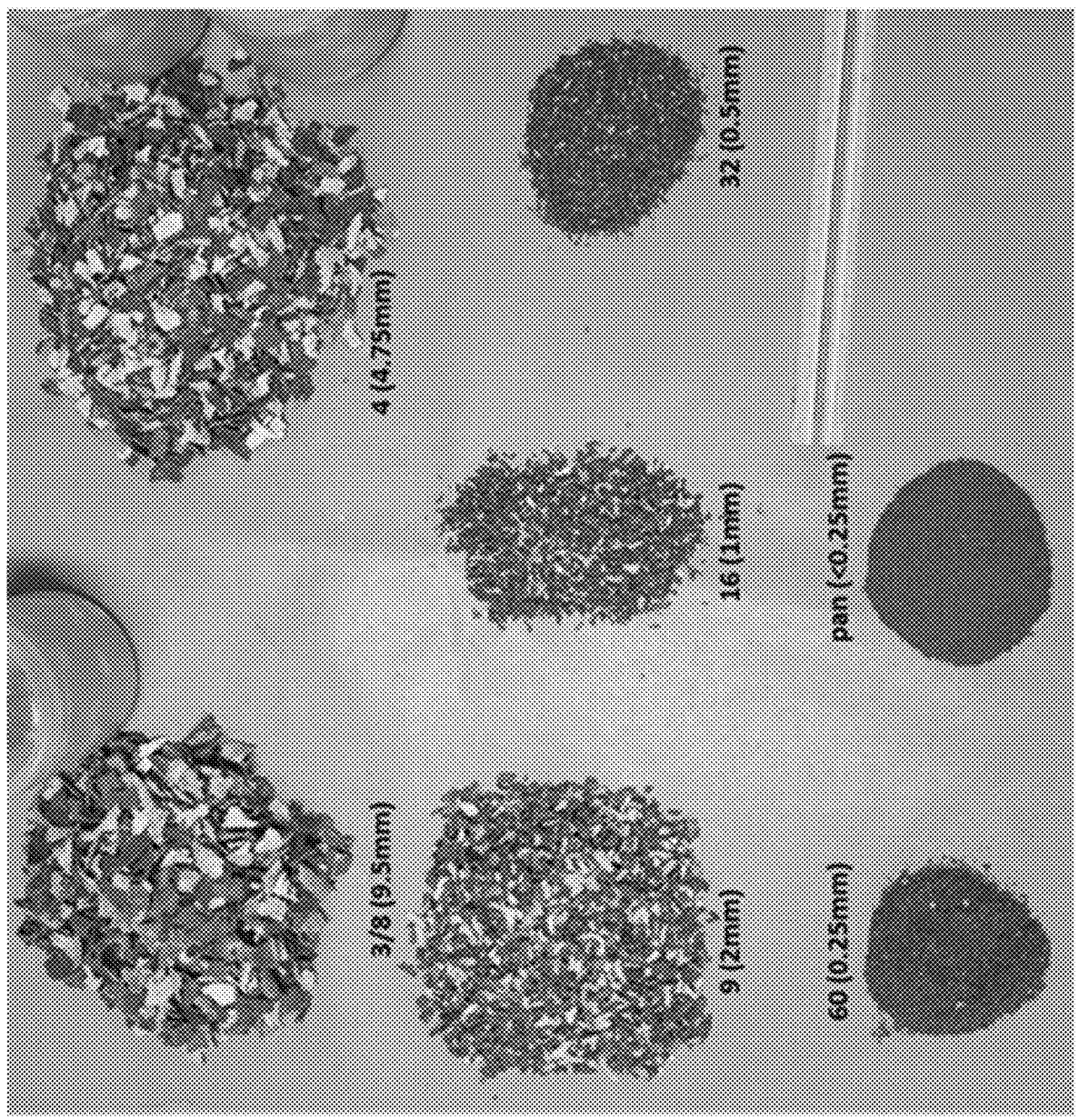
FIG. 9 shows the visual aspect of non-conductive material resulting from electrostatic separation of each sieved fraction.

FIG. 9 shows the visual aspect of non-conductive material resulting from electrostatic separation of each sieved fraction. Most of these non-conductive fractions include encapsulated semiconductor layers. The fractions 4.5 mm to 9.5 mm (corresponding to ~77% of the total mass) may produce a conductive fraction that includes some polymer.

In this specific example, a separate (white) polymer was present in the backsheet of the solar module. This polymer comprising polyvinyl fluoride (PVF) and/or polyvinylidene fluoride (PVDF), decreased in appearance in the thinner fractions.

As disclosed herein, copper wire fractions may be separated from the used solar module by electrostatic separation of a sieved fraction. Embodiments may also apply this principle to separating other materials, such as silicon and/or silver.

Figure 10:
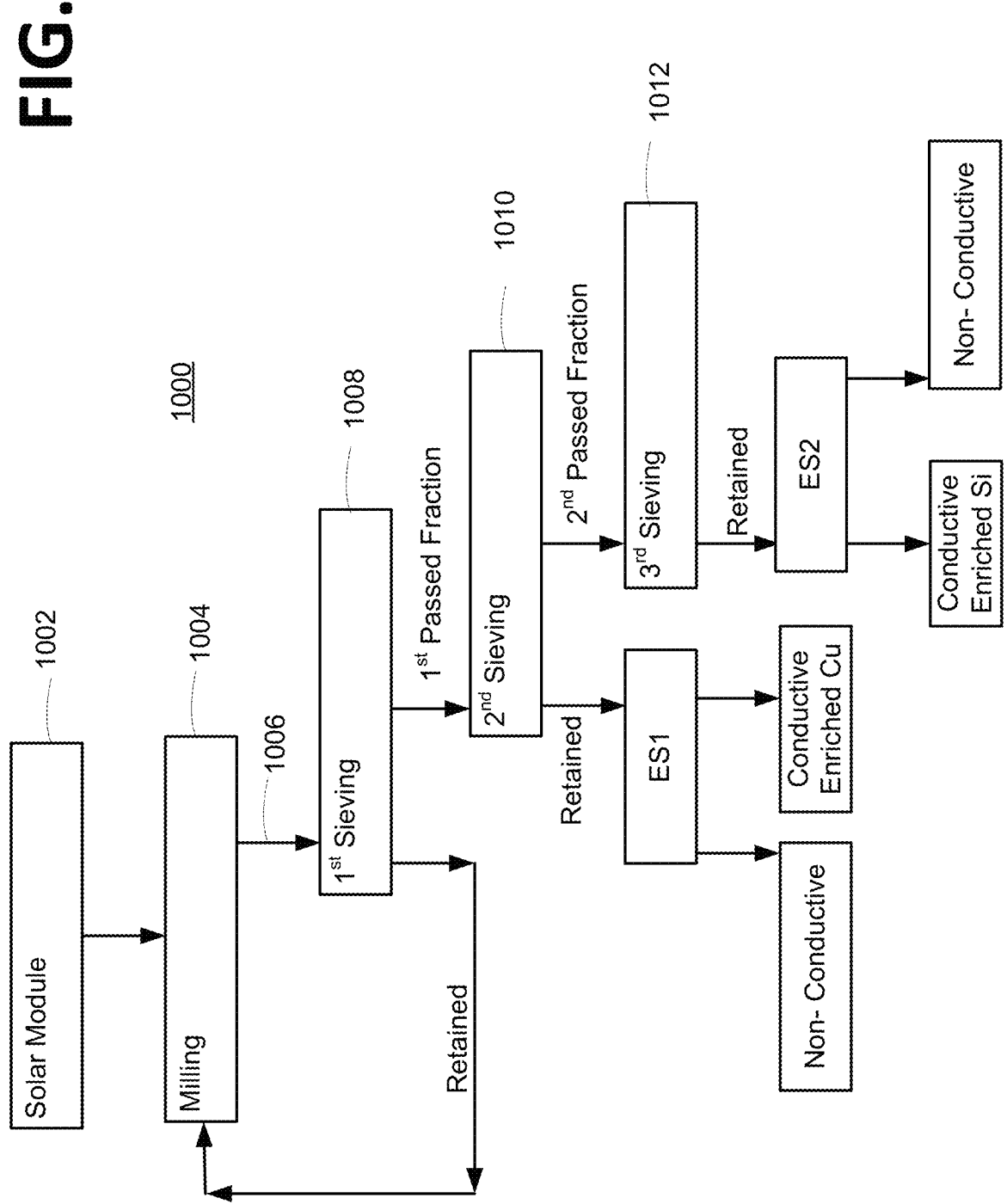
FIG. 10 shows a simplified flow diagram.

Embodiments may obtain a high percentage of the conductive material from the fractions of about 0.25 to 1 mm, with a high purity. As shown in the simplified flow diagram 1000 of FIG. 10, after milling 1004 of an incoming solar module 1002 comprising polymer, glass, silicon, copper, and silver, the resulting feedstock 1006 may be subjected to serial sieving into three fractions:

1) 1st sieving 1008: opening about 4.75 to 9.5 mm
2) 2nd sieving 1010: opening about 1 to 2 mm
3) 3rd sieving 1012: opening<about 0.25 mm to 0.5 mm.

The first retained fraction (4.75-9 mm) would return to the milling step and then return to the sieving process.

The second retained fraction (1-2 mm) would enter the first electrostatic separation (ES 1). This second fraction would produce mainly copper.

The third retained fraction (<0.25 to 0.5 mm) would be destined for the second electrostatic separation (ES 2). That second electrostatic separation could be performed under the same or different conditions as the first electrostatic separation. The second electrostatic separation may result in a fraction that is primarily silicon and silver.

Embodiments of processing solar modules for recycling could enhance the separation efficiency parameters for each material. This is because the feedstock would be more homogeneous in comparison to the mixed fraction.

Figure 11:
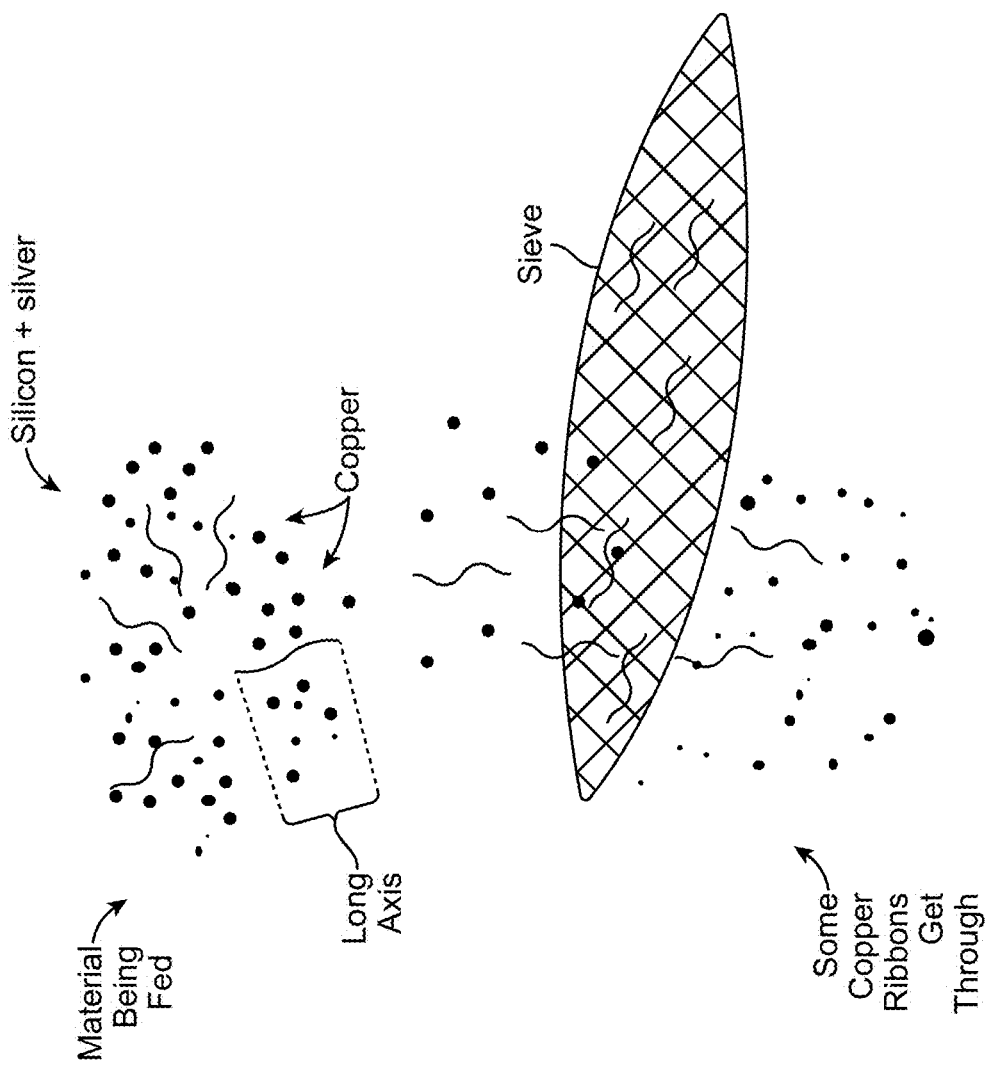
FIG. 11 shows a simplified perspective view of one embodiment of a sieve.

FIG. 11 shows a simplified perspective view of one embodiment of a sieve in operation. Specifically, an incoming mixture comprises fine particles of silicon and silver. The mixture also comprises elongated fragments of metal (such as copper), which may have originally been in the form of ribbons, wires, or conductive fingers.

FIG. 11 shows that as the incoming mixture is delivered downward to the sieve, some of the elongated fragments are oriented with their short axis passing through the sieve opening, while other elongated fragments are oriented with their long axis blocking passage through the sieve.

Figure 12:
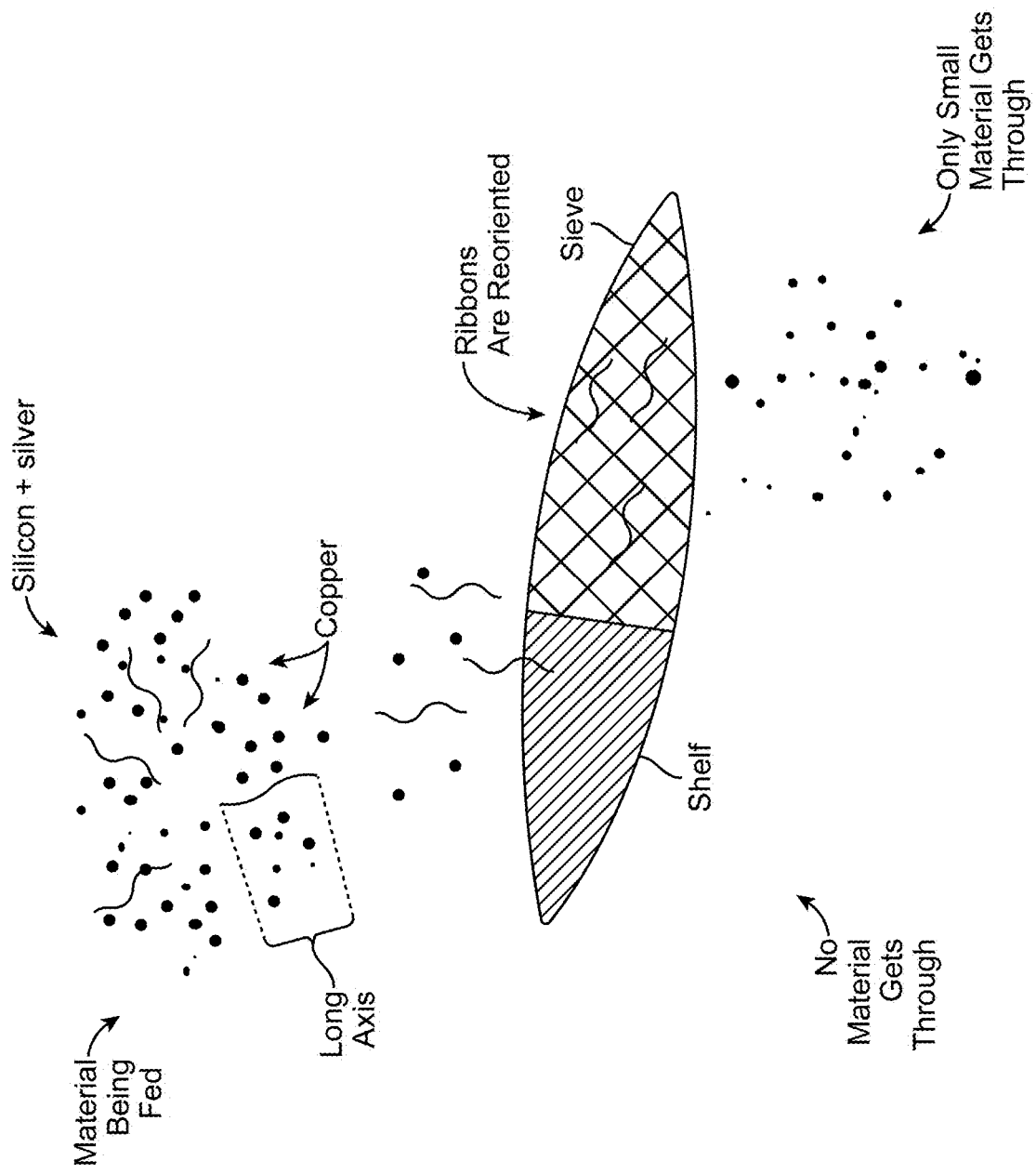
FIG. 12 shows an alternative embodiment of a sieve.

In order to achieve more uniform sieving, FIG. 12 shows an alternative embodiment. Here, the incoming mixture is delivered downward to initially contact a solid shelf or platform.

As a result of this initial contact, the elongated fragments settle flat on the shelf, with their long axes in a consistent orientation relative to the sieve opening. Thus, the elongated fragments are blocked from passing through the sieve, and instead are uniformly separated and then moved horizontally to the output for capture.

Movement of the material from the shelf to the sieve opening, can be accomplished through vibration and/or the force of gravity. In this manner, the shape of the constituents of the mixture can influence the effect of the sieving.

Clause 1A. A method comprising:
milling a solar module to create a first feedstock comprising polymer, copper, and silicon;
performing a first sieving of the first feedstock to create a first retained fraction and a first passed fraction;
re-milling the first retained fraction;
performing a second sieving of the first passed fraction to create a second retained fraction and a second passed fraction;
performing a third sieving of the second passed fraction to create a third retained fraction and a third passed fraction; and
performing electrostatic separation of the second retained fraction to create a conductive fraction enriched in copper.

Clause 2A. A method as in Clause 1A wherein:
the first sieving is performed with an opening of between about 9.5-4.5 mm;
the second sieving is performed with an opening of between about 2-1 mm; and
the third sieving is performed with an opening of between about 0.5-0.25 mm.

Clause 3A. A method as in any of Clauses 1A or 2A wherein the first feedstock comprises pieces of 10 mm or less.

Clause 4A. A method as in any of Clauses 1A, 2A, or 3A further comprising performing a visual analysis of the second passed fraction to determine a polymer content.

Clause 5A. A method as in any of Clauses 1A, 2A, 3A, or 4A further comprising performing electrostatic separation of the third retained fraction to create a conductive fraction enriched in silicon.

Clause 6A. A method as in Clause 5A wherein:
the first feedstock also comprises silver; and
the conductive fraction is also enriched in silver.

Clause 7A. A method as in Clause 5A wherein the electrostatic separation of the third retained fraction and the electrostatic separation of the second retained fraction are performed under different conditions.

Clause 1B. A method comprising:
receiving a mixture of materials from a used solar module, the mixture of materials comprising an elongated metal fragment having a long axis;
causing the mixture to settle on a platform, with the long axis substantially perpendicular to a sieve opening; and
moving the mixture from the platform to a sieve, such that the long axis blocks passage of the elongated fragment through the sieve opening.

Clause 2B. A method as in Clause 1B wherein the elongated metal fragment comprises a ribbon.

Clause 3B. A method as in any of Clauses 1B or 2B wherein the elongated metal fragment comprises copper.

Clause 1C. A method comprising:
milling a solar module to create a first feedstock comprising polymer, copper, and silicon;
performing a first sieving of the first feedstock to create a first retained fraction and a first passed fraction; and
performing a second sieving of the first passed fraction to create a second retained fraction and a second passed fraction.

Clause 2C. A method as in Clause 1C wherein:
the first sieving is performed with an opening of between about 9.5-4.5 mm; and the second sieving is performed with an opening of between about 2-1 mm.

Clause 3C. A method as in any of Clauses 1C or 2C wherein the first feedstock comprises pieces of 10 mm or less.

Clause 4C. A method as in any of Clauses 1C, 2C, or 3C further comprising:
re-milling the first retained fraction.

Clause 5C. A method as in any of Clauses 1C, 2C, 3C, or 4C further comprising:
performing electrostatic separation of the second retained fraction to create a conductive fraction enriched in copper.

Clause 6C. A method as in any of Clauses 1C, 2C, 3C, 4C, or 5C further comprising performing a visual analysis of the second passed fraction to determine a polymer content.

Clause 7C. A method as in Clause 6C wherein the polymer content comprises at least one of polyvinyl fluoride (PVF) and/or polyvinylidene fluoride (PVDF).

Clause 8C. A method as in any of Clauses 6C or 7C wherein the solar module comprises a polymer backsheet.

Clause 9C. A method as in any of Clauses 6C, 7C, or 8C wherein the visual analysis is based upon coloration.

Clause 10C. A method as in any of Clauses 6C, 7C, 8C, or 9C wherein the polymer content is white.

Clause 11C. A method as in any of Clauses 1C, 2C, 3C, 4C, 5C, 6C, 7C, 8C, 9C, or 10C further comprising:
performing a third sieving of the second passed fraction to create a third retained fraction and a third passed fraction.

Clause 12C. A method as in Clause 11C wherein:
the first sieving is performed with an opening of between about 9.5-4.5 mm;
the second sieving is performed with an opening of between about 2-1 mm; and
the third sieving is performed with an opening of between about 0.5-0.25 mm.

Clause 13C. A method as in any of Clauses 11C or 12C further comprising performing electrostatic separation of the third retained fraction to create a conductive fraction enriched in silicon.

Clause 14C. A method as in Clause 13C wherein:
the first feedstock also comprises silver; and
the conductive fraction is also enriched in silver.

Clause 15C. A method as in any of Clauses 13C or 14C further comprising:
performing electrostatic separation of the second retained fraction to create a conductive fraction enriched in copper, wherein,
the electrostatic separation of the third retained fraction and the electrostatic separation of the second retained fraction are performed under different conditions.

Clause 16C. A method as in any of Clauses 13C, 14C, or 15C further comprising performing a visual analysis of the third retained fraction to determine a polymer content.

Clause 17C. A method as in Clause 16C wherein the polymer content comprises at least one of polyvinyl fluoride (PVF) and/or polyvinylidene fluoride (PVDF).

Clause 18C. A method as in any of Clauses 16C or 17C wherein the solar module comprises a polymer backsheet.

Clause 19C. A method as in any of Clauses 16C, 17C, or 18C wherein the visual analysis is based upon coloration.

Clause 20C. A method as in any of Clauses 16C, 17C, 18C, or 19C wherein the polymer content is white.

Example

Sieving studies were performed using samples from monofacial modules to separate and/or enrich valuable materials from the used modules. As shown in the simplified flow diagram of FIG. 14, modules without frames and junction boxes were crushed using a 6 mm screen size.

The post-crusher samples were then sieved. Materials that passed through a 0.26 mm sieve presented a concentrated fraction of silver and silicon.

The retained samples were electrostatically(ES) separated into conductive and non-conductive fractions. The electrically conductive fractions (ECF) presented concentrated metals (silicon, copper, silver).

The electrically non-conductive fraction (ENCF) presented a mixture of glass and plastics. The ENCF is passed through an airflow separation process, obtaining a high-quality optical glass (heavy fraction) and a fraction of plastics (light fraction). The obtained high-quality glass can be furtherly recycled into new products.

Figure 14:
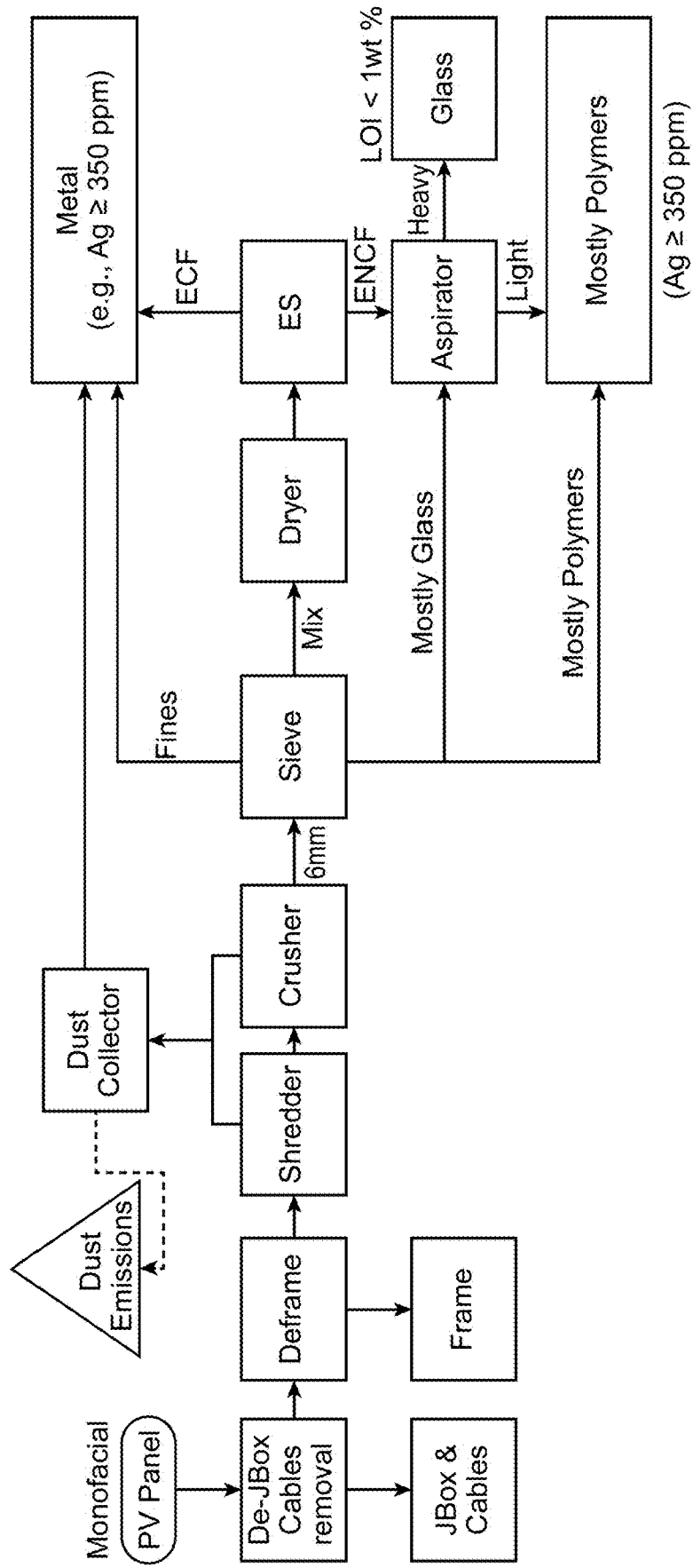
FIG. 14 is a simplified flow diagram illustrating used solar module recycling according to an embodiment.

The simplified flow diagram of FIG. 14 further indicates that sieving can be used pre-ES, to produce specific streams of materials of interest. The silver concentration showing Ag 350 ppm+is indicative of fractions containing a minimum of 350 parts per million of Ag.

The separated glass may have less than about 1 weight % loss on ignition (LOI). This corresponds to having relatively little polymer content.

Sieving studies were also performed using samples from used bifacial modules panels to separate and/or concentrate valuable materials. Panels without frame and junction box were crushed in a crusher using a 6 mm screen size.

High quality optical glass with low quantity of polymers, can be obtained by using a 4.75 mm sieve. The retained material can be passed through an airflow separation process (e.g., aspirator), obtaining a high-quality glass (heavy fraction) and a fraction of plastics (light fraction). The obtained high-quality glass can be further recycled into new products.

Used solar modules can be thermally treated to remove encapsulant material(s). After removal of encapsulant(s), a mixture of glass, silicon wafers, and ribbons may be generated.

Such a mixture can be sieved in different ways to obtain concentrated fractions of each component. There may be differences between the nature of the materials obtained, such as form and thickness.

The thickness of the silicon wafer usually has a range of between about 150-300 micrometers. This is thinner in comparison to the glass (about 3-4 mm for monofacial panels; about 2-2.4 mm for bifacial panels).

A thickness-based separation device was used. The device was designed to have devices positioned at different angles and positions, which only the thin particles can pass through while the thicker ones do not. A concentration of silicon wafers and glass is thereby obtained.

Copper ribbons may be present in outputs of a thickness-based separation device. The main characteristic of the ribbon is its elongation, which can be different from the silicon and glass pieces.

Accordingly, the materials can be sieved, where the elongated fragments are oriented with their short axis passing through the sieve opening. Other elongated fragments are oriented with their long axis blocking passage through the sieve.

It is noted that the following comprises a non-exclusive list of materials that may form a backsheet of a used solar module:
Aluminum
glass
polyethylene terephthalate (PET)
polyvinyl fluoride (PVF)
polyvinylidene fluoride (PVDF)
polypropylene (PP)
ethylene vinyl acetate (EVA)
polyamide (PA)
polycarbonate (PC)
fluoropolymer-based laminates
Terpolymer of Tetrafluoroethylene, Hexafluoropropylene, and Vinylidene Fluoride (THV)
Ethylene Tetrafluoroethylene (ETFE)
Ethylene Chlorotrifluoroethylene (ECTFE)
thermoplastic polyolefin (TPO)
polyvinyl chloride (PVC).

A backsheet may comprise a combination of one or more of the above listed materials. The visual appearance of backsheet materials may or may not differ from other components of a used solar module.

It is further noted that the following comprises a non-exclusive list of materials that may be present as polymer encapsulant in a used solar module:
Ethylene-vinyl acetate (EVA)
polyolefin elastomer (POE)
silicone
Polyvinyl butyral (PVB)
IONOMER
thermoplastic polyolefin (TPO).

Encapsulant may comprise a combination of one or more of the above listed materials. The visual appearance of encapsulant materials may or may not differ from other components of a used solar module.

Clause 1D. A method comprising:
mechanically processing a used solar module to create a feedstock comprising polymer and metal; and
sieving the feedstock to obtain a first fraction comprising the polymer, and a second fraction comprising the metal.

Clause 2D. A method as in Clause 1D wherein the metal comprises silver.

Clause 3D. A method as in Clause 2D wherein the first fraction comprises silver greater than or equal to 350 ppm.

Clause 4D. A method as in any of Clauses 2D or 3D wherein the second fraction comprises silver greater than or equal to 350 ppm.

Clause 5D. A method as in any of Clauses 1D, 2D, 3D, or 4D wherein sieving the feedstock results in a third fraction comprising glass.

Clause 6D. A method as in Clause 5D further comprising separating the third fraction to produce a glass fraction with less than about 1 weight % loss on ignition (LOI).

Clause 7D. A method as in Clause 6D wherein the separating comprises airflow separation.

Clause 8D. A method as in Clause 7D wherein the airflow separation uses an aspirator.

Clause 9D. A method as in any of Clauses 1D, 2D, 3D, 4D, 5D, 6D, 7D, or 8D wherein the feedstock comprises an elongated metal fragment having a long axis.

Clause 10D. A method as in Clause 9D wherein the sieving further comprises:
causing the feedstock to settle on a platform, with the long axis substantially perpendicular to a sieve opening; and
moving the feedstock from the platform to a sieve, such that the long axis blocks passage of the elongated fragment through the sieve opening.

Clause 11D. A method as in any of Clauses 9D or 10D wherein the elongated metal fragment comprises a ribbon.

Clause 12D. A method as in any of Clauses 9D, 10D, or 11D wherein the elongated metal fragment comprises copper.

Clause 13D. A method as in any of Clauses 9D, 10D, 11D, or 12D wherein the feedstock is moved from the platform to the sieve using vibration.

Clause 14D. A method as in any of Clauses 9D, 10D, 11D, 12D, or 13D wherein the elongated metal fragment is moved to the sieve opening by gravity.

Clause 15D. A method as in any of Clauses 1D, 2D, 3D, 4D, 9D, 10D, 11D, 12D, 13D, or 14D wherein sieving the feedstock results in a third fraction comprising metal, polymer and glass, the method further comprising:
subjecting the third fraction to electrostatic separation to create an electrically conducting fraction and a non-electrically conducting fraction.

Clause 16D. A method as in Clause 15D wherein:
wherein the metal comprises silver; and
the electrically conducting fraction comprises silver.

Clause 17D. A method as in Clauses 15D or 16D further comprising subjecting the non-electrically conducting fraction to air separation to produce a glass fraction with less than about 1 weight % loss on ignition (LOI).

Clause 18D. A method as in Clause 17D wherein the air separation further produces a polymer fraction.

Clause 19D. A method as in any of Clauses 18D or 19D wherein:
the metal comprises silver; and
the polymer fraction comprises silver greater than or equal to 350 ppm.

Clause 20D. A method as in any of Clauses 1D, 2D, 3D, 4D, 5D, 6D, 7D, 8D, 9D, 10D, 11D, 12D, 13D, 14D, 15D, 16D, 17D, 18D, or 19D wherein the used solar module is monofacial.

Clause 21D. A method as in any of Clauses 1D, 2D, 3D, 4D, 5D, 6D, 7D, 8D, 9D, 10D, 11D, 12D, 13D, 14D, 15D, 16D, 17D, 18D, or 19D wherein the used solar module is bifacial.

What is claimed is:

1. A method comprising:
milling a used solar module to create a feedstock comprising polymer and metal; and
sieving the feedstock to obtain a first fraction comprising the polymer, and a second fraction comprising the metal,
wherein sieving the feedstock results in a third fraction comprising metal, polymer and glass, the method further comprising:
subjecting the third fraction to electrostatic separation to create an electrically conducting fraction and a non-electrically conducting fraction.

2. A method as in claim 1 wherein the used solar module is monofacial.

3. A method as in claim 1 wherein the metal comprises silver.

4. A method as in claim 3 wherein the first fraction comprises silver greater than or equal to 350 ppm.

5. A method as in claim 3 wherein the second fraction comprises silver greater than or equal to 350 ppm.

6. A method as in claim 1 wherein sieving the feedstock results in a third fraction comprising glass.

7. A method as in claim 6 further comprising separating the third fraction to produce a glass fraction with less than about 1 weight % loss on ignition (LOI).

8. A method as in claim 7 wherein the separating comprises airflow separation.

9. A method as in claim 8 wherein the airflow separation uses an aspirator.

10. A method as in claim 1 wherein the feedstock comprises an elongated metal fragment.

11. A method as in claim 10 wherein the sieving further comprises:
causing the feedstock to settle on a platform; and
moving the feedstock from the platform to a sieve, such that the elongated fragment is blocked from moving through a sieve opening.

12. A method as in claim 11 wherein the elongated metal fragment comprises a ribbon.

13. A method as in claim 11 wherein the elongated metal fragment comprises copper.

14. A method as in claim 11 wherein the feedstock is moved from the platform to the sieve using vibration.

15. A method as in claim 11 wherein the elongated metal fragment is moved to the sieve opening by gravity.

16. A method as in claim 1 wherein:
wherein the metal comprises silver; and
the electrically conducting fraction comprises silver.

17. A method as in claim 1 further comprising subjecting the non-electrically conducting fraction to air separation to produce a glass fraction with less than about 1 weight % loss on ignition (LOI).

18. A method as in claim 17 wherein the air separation further produces a polymer fraction.

19. A method as in claim 18 wherein:
the metal comprises silver; and
the polymer fraction comprises silver greater than or equal to 350 ppm.

* * * * *